United States Patent [19]

Iwase

[11] Patent Number: 4,694,485
[45] Date of Patent: Sep. 15, 1987

[54] CORDLESS TELEPHONE

[75] Inventor: Sumio Iwase, Tokyo, Japan

[73] Assignee: Sony Corporation, Tokyo, Japan

[21] Appl. No.: 912,185

[22] Filed: Sep. 25, 1986

Related U.S. Application Data

[63] Continuation of Ser. No. 596,947, Apr. 5, 1984, abandoned.

[30] Foreign Application Priority Data

Apr. 7, 1983 [JP] Japan .................................. 58-61301

[51] Int. Cl.$^4$ ........................................... H04M 11/00
[52] U.S. Cl. ...................................... 379/62; 379/61; 379/64; 455/34
[58] Field of Search .................... 455/33, 32, 34, 62, 455/76, 77, 166, 167; 379/61, 62, 63

[56] References Cited

U.S. PATENT DOCUMENTS 4,228,319 10/1980 De Jager et al. ................. 179/2 EB
4,467,141 8/1984 Resch et al. ...................... 179/2 EA

FOREIGN PATENT DOCUMENTS

WO83/02380 7/1983 PCT Int'l Appl. .

Primary Examiner—Robert Lev
Attorney, Agent, or Firm—Lewis H. Eslinger; Alvin Sinderbrand

[57] ABSTRACT

A cordless telephone in which communication between a base unit connected to a telephone network and a handset unit is carried out by radio waves, includes a transmitting and receiving system in the base unit and a transmitting and receiving system in the handset and first and second control circuits provided in the base unit system and in the handset, respectively, each include a detecting circuit for detecting whether any signal is present in an initally selected channel at the time communication is to be initiated between the base unit and the handset unit. Such signals being present in the initially selected channel may be caused by interference from other cordless telephone systems in the vicinity. Channel selector apparatus acts to change the base unit and handset from the occupied channel to a vacant channel. Depending on whether it is an incoming call or an outgoing call either the first control circuit of the base unit or the second control circuit of the handset selects the vacant channel in response to an instruction command from the other control circuit.

19 Claims, 7 Drawing Figures

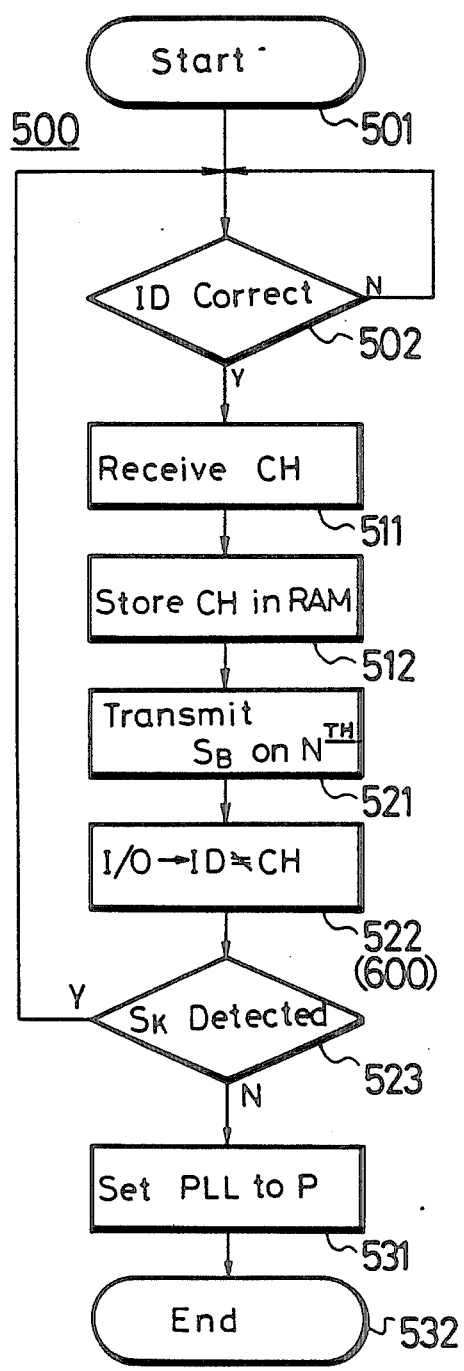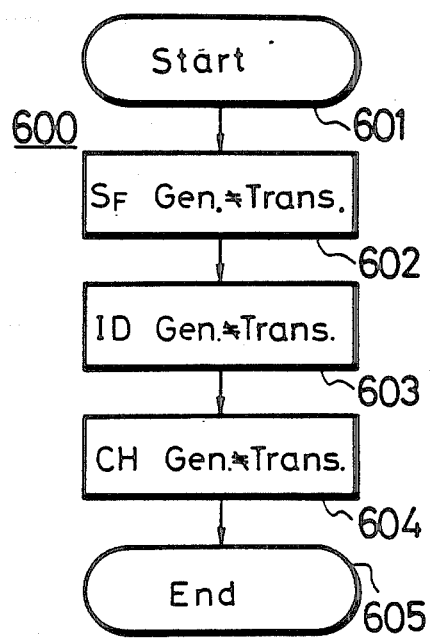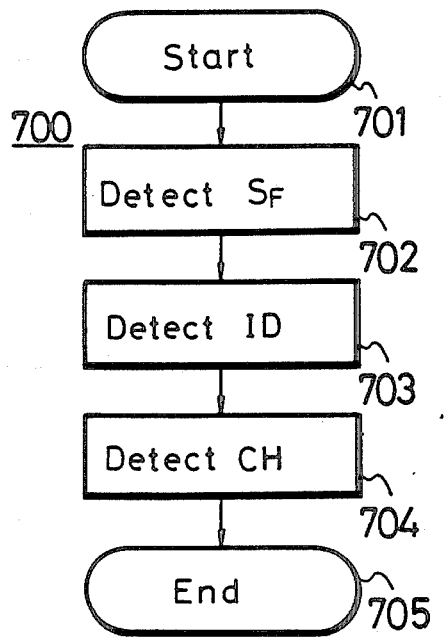

CORDLESS TELEPHONE

This is a continuation of application Ser. No. 596,947 filed Apr. 5, 1984, now abandoned.

BACKGROUND OF THE INVENTION

1. Field of the Invention

The present invention relates generally to an improved cordless telephone and, specifically, to a cordless telephone that automatically changes the radiowave frequency between the handset and the base unit, in order to prevent interference with adjacent cordless telephones.

2. Description of the Prior Art

Generally, the range of movement permitted the user of a telephone is limited by the length of the telephone cord and practical considerations place a limit on such cord lengths. To overcome this problem, cordless telephones are becoming more frequently used in this country, as well as in certain foreign countries. Typically, such cordless telephone systems consist of a transmitter-receiver, in the form of a cordless handset, and a transmitter-receiver forming a so-called base unit system that is connected to the telephone line network. The handset and the base unit are coupled with each other through radio waves transmitted and received by their respective antennas.

A telephone subscriber typically uses such cordless telephone in the following manner. When calling someone, a talk button on the handset is changed from a standby position to an ON position and the call is made. Alternatively, when one wishes to receive incoming telephone calls the talk switch is placed in the standby position and when the telephone call comes in, the talk switch is changed over to the ON position. In other words, the talk switch must be in the ON state when the user intends to talk. In using a cordless telephone, the telephone subscriber can move about freely with the handset system without fear of tangling a lengthy telephone cord. The useful distance between the handset and the base unit is referred to as the service area and is typically around 300 meters, with a maximum transmission range being set by regulations of the Federal Communications Commission (FCC) The frequency of the radio waves transmitted between the handset system and the base unit system are typically in the 40 MHZ band and in the 1 MHZ band, and in most cases five duplex channels for each system are permitted by the FCC.

As described above, while great convenience is afforded the telephone subscriber is using a cordless telephone, problems arise because the handset and base unit communicate with each other through radio waves. As a result, if another cordless telephone having the same or similar frequency bands is being utilized in the immediate vicinity, such as in a neighboring house near where the subject cordless telephone is in use, radio interference will quite frequently occur between these two cordless telephone systems. If such interference with the neighboring cordless telephone does occur, it is then necessary to change the communication channel being utilized between the handset and the base unit system and this is frequently accomplished by taking the handset and base unit to a service station or repair facility where the quartz crystal oscillators in the broadcast units are replaced with ones of different frequency. Obviously this is both troublesome and disadvantageous from a time and money standpoint. Moreover, even after changing the oscillation frequencies to select new transmission channels, if the new channel is also occupied by a different cordless telephone used nearby, then the oscillator crystals must be changed once again. One proposed system for solving this problem is to change the broadcast channels of the handset and the base unit by using manually operated channel selector switches. Nevertheless, in such cases where radio interference occurs, the telephone subscriber must change not only the channel of the handset system, which is remotely arranged to the base unit, but the user must go back to the base unit and change the channel there to agree with that to which the handset was changed. This obviously reduces the effectiveness of a cordless telephone.

OBJECTS AND SUMMARY OF THE INVENTION

Accordingly, it is an object of the present invention to provide a cordless telephone that can eliminate the above-noted defects inherent in the prior art.

Another object of the present invention is to provide an improved cordless telephone in which the communication channel between the handset and the base unit is automatically set to a vacant channel not then in use within the transmission range of the cordless telephone.

A further object of this invention is to provide an improved cordless telephone which is free of radio interference caused by adjacent or nearby cordless telephones.

It is a still further object of the present invention to provide an improved cordless telephone in which the broadcast channel between the handset and the base unit can be changed quickly and at no expense without replacing oscillator crystals and without manual switches.

In accordance with an aspect of the present invention, a cordless telephone includes a handset that is in communication with the base unit, which is connected by wires to the telephone network, and which includes a transmitting system circuit and a receiving system circuit and the handset includes a transmitting system circuit and a receiving system circuit. The invention provides a first control circuit in the base unit and a second control circuit in the handset. A detector means is provided in either the first control circuit of the base system or in the second control circuit of the handset system to detect the occupied channel when a communication between the base unit and the handset is commenced and operates to change the occupied channel to a vacant channel. Also provided is a channel selector system in either the first control circuit of the base unit or the second control circuit of the handset that sets the system to a vacant channel in response to an instruction from the control circuit located at the unit in which the channel selector is not located.

According to another aspect of the present invention a cordless telephone system is provided having two, separate control circuits and a detector to detect the unoccupied channel and a channel selector for setting the channel in the base unit to the vacant channel in response to an instruction transmitted from the handset.

The above, and other objects, features, and advantages of the present invention will become apparent from the following detailed description of illustrated embodiments thereof to be read in conjunction with the accompanying drawings, in which like references designate the same elements and parts.

BRIEF DESCRIPTION OF THE DRAWINGS

FIG. 5 is a flow chart of a sub-routine showing the steps involving automatically transmitting signals for setting the broadcast channel to a vacant channel according to the present invention;

FIG. 6 is a flow chart of a sub-routine showing steps taken in generating various signals in the handset and base unit according to the present invention; and FIG. 7 is a flow chart showing a sub-routine showing the steps taken in detecting and identifying signals generated according to the sub-routine of FIG. 6, according to the present invention.

DETAILED DESCRIPTION OF PREFERRED EMBODIMENTS

Figure 1:
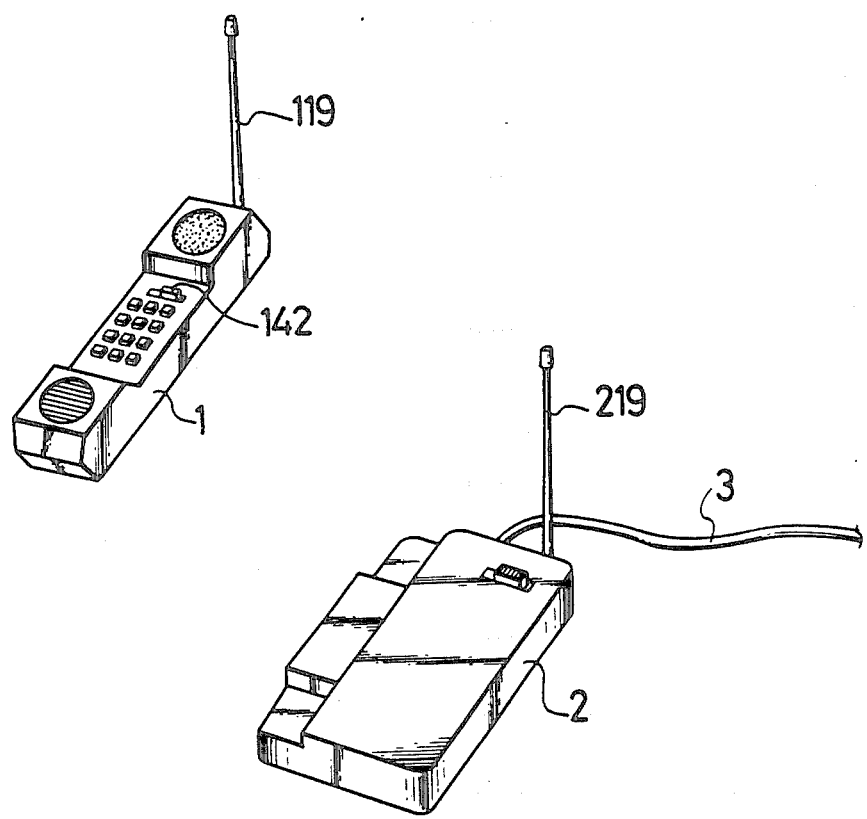
FIG. 1 is a perspective view of a cordless telephone system showing the handset and the base unit.

The cordless telephone system in FIG. 1 consists of cordless handset 1 containing a transmitting circuit and a receiving circuit, and a transmitting circuit and receiving circuit are also formed in base unit 2. Base unit 2 is connected by telephone cord or network line 3 to the existing telephone network; however, handset 1 and base unit 2 are not connected by wires and communicate therebetween by way of radio waves using antennas 119 and 219, respectively. In using the cordless telephone of FIG. 1, when the user wishes to place an out-going call talk switch 142 is changed over to an ON position, and when the user wishes to receive calls talk switch 142 is placed to a standby position. In the event that there is an incoming call, switch 142 in handset 1 must first be set to the standby position to receive the call and then subsequently moved to the ON position to talk with the caller.

Figure 2:
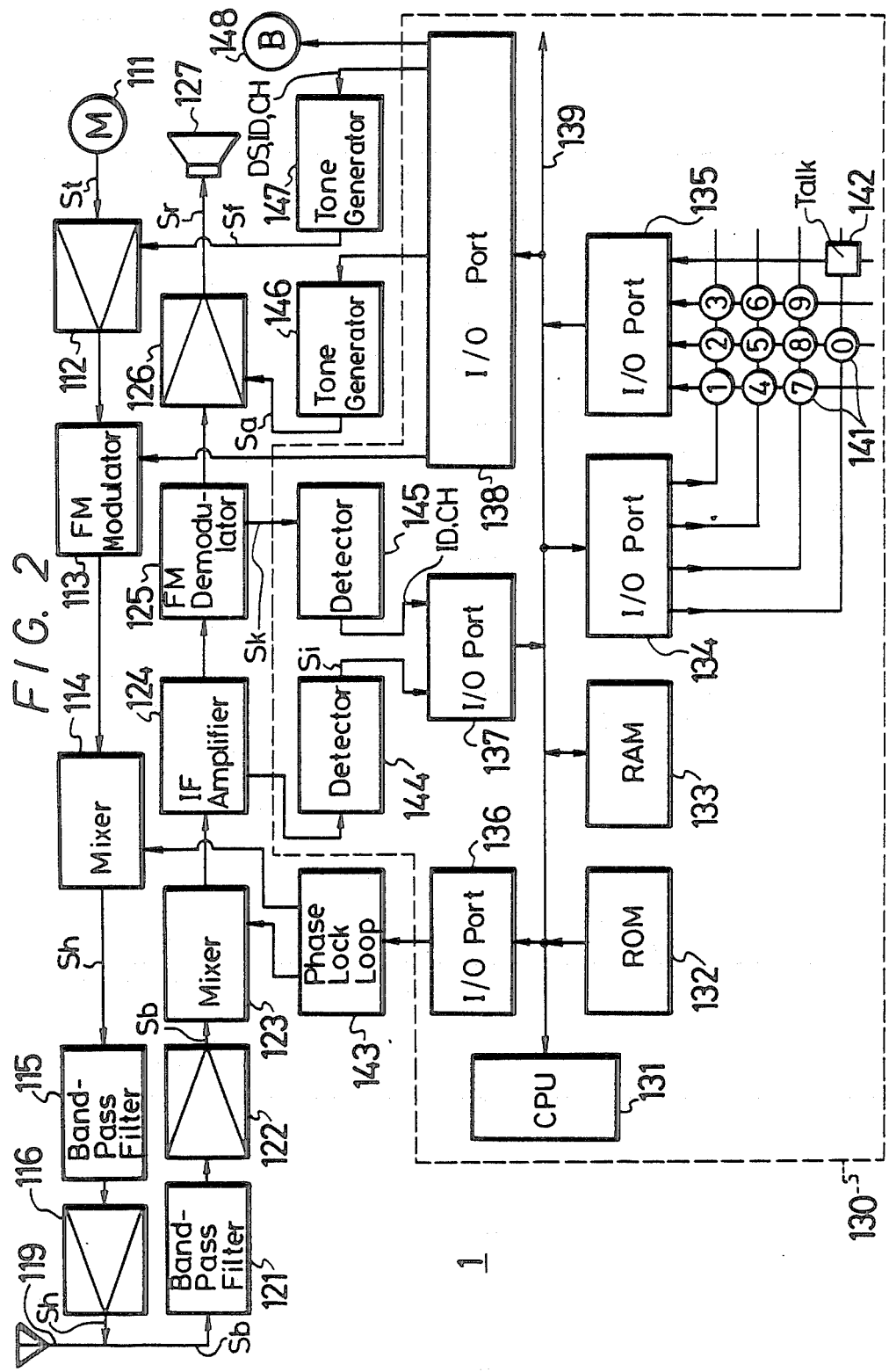
FIG. 2 is a block diagram of the circuitry of a handset for use in a cordless telephone system according to the present invention.

In FIG. 2, the circuitry of the handset system 1 is represented and, specifically, when transmitting is desired, talk switch 142 of handset 1 is changed over in position from standby position to the ON position (not shown) and an audio signal St is produced by microphone 111 when the user commences talking, and this audio signal St is supplied through low-frequency amplifier 112 to FM modulator 113, where it is frequency modulated to a FM intermediate frequency signal. This FM signal (IF) is supplied to mixer 114 wherein it is mixed, with an alternating signal (local oscillator signal) having a predetermined frequency and which is produced by a phase-locked-loop (PLL) circuit 143, in mixer 114. The result is the FM signal from the FM modulator 113 is frequency modulated to an FM signal Sh having a frequency corresponding to a predetermined one of the possible cordless telephone channels, for example, an upper one of the possible channels. This FM signal Sh is fed through bandpass filter 115, which has a pass band that includes every upper channel, to high-frequency power amplifier 116. The thus amplified signal is fed to antenna 119, which transmits the FM signal Sh to the base unit system 2.

Figure 3:
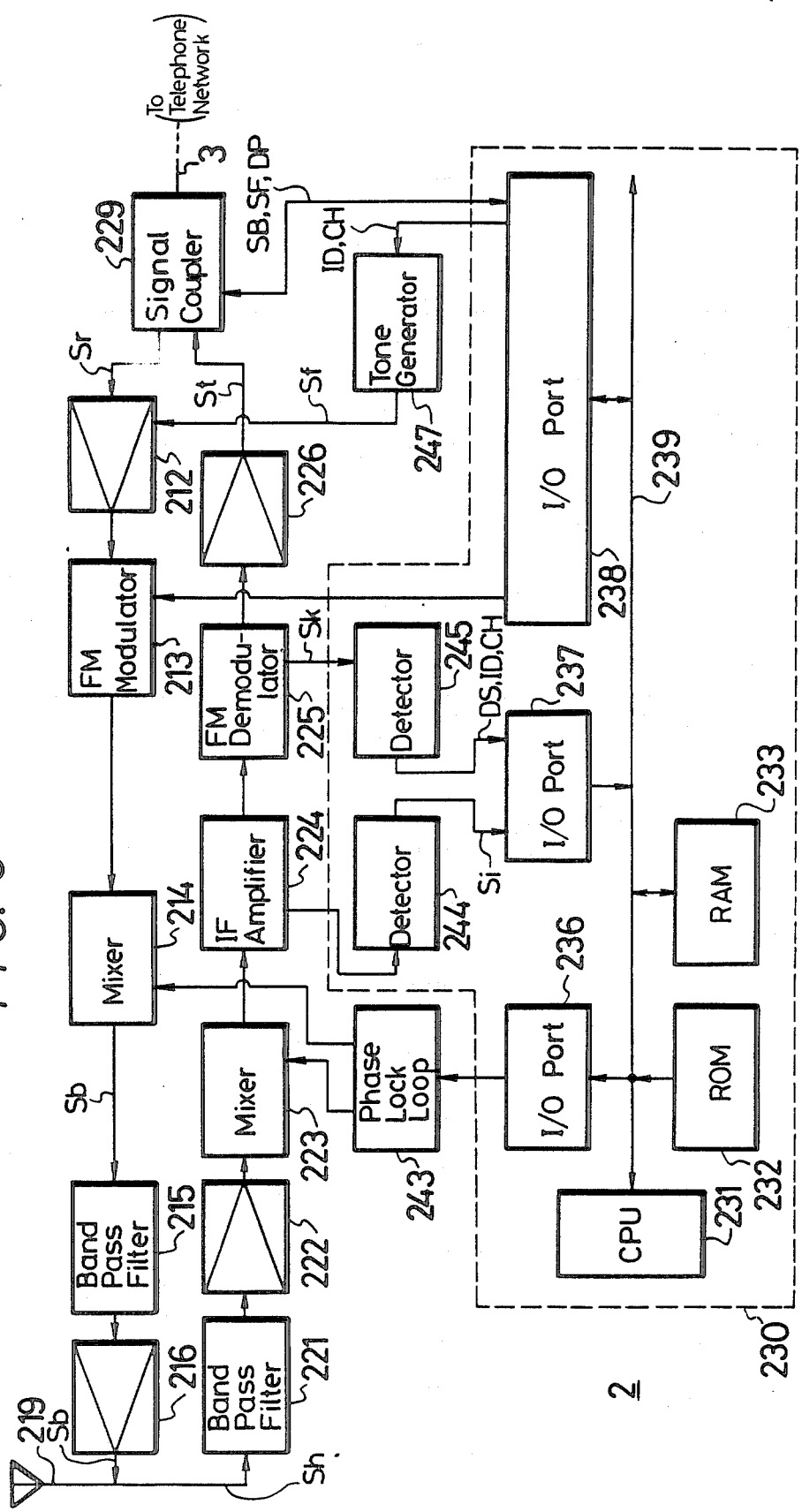
FIG. 3 is a block diagram of the circuitry of a base unit system for use in a cordless telephone system according to the present invention.

FIG. 3 shows the circuitry of base unit 2 and, in particular, the radio-wave signal Sh broadcast from antenna 119 of handset 1 is received at antenna 219 and is fed to bandpass filter 221 having a pass band that includes all upper ones of the possible channels. The output of bandpass filter 221 is fed through high-frequency amplifier 222 to one input of mixer 223. The other input of mixer 223 is a local oscillator signal of predetermined frequency that is generated by phase-locked-loop (PLL) circuit 243. Thus, the received signal Sh is converted in frequency to an intermediate frequency (IF) signal. This IF signal is fed through intermediate-frequency amplifier 224 to FM demodulator 225 that demodulates the audio signal St. This demodulated audio signal St is fed through low-frequency amplifier 226 to signal coupler 229 and thus onto the telephone network line 3.

In the case of an incoming call over the telephone network connected by line 3 to signal coupler 229, the incoming audio signal Sr is fed to loudspeaker 127 contained in handset 1 after having been processed in the same fashion as the outgoing signals. More specifically, and referring again to FIG. 3, audio signal Sr from the telephone network line 3 is fed through signal coupler 229 to low-frequency amplifier 212 and thus to FM modulator 213, wherein it is modulated to an FM signal. The FM modulated audio signal is fed to one input of mixer 214, and the other input to mixer 214 is a local oscillator signal of predetermined frequency from phase-locked-loop circuit 243. This mixer 214 frequency converts the FM audio signal to an FM signal Sb having a lower channel than the channel of FM signal Sh, for example, a lower one of the N possible channels. Frequency converted audio signal Sb is fed through bandpass filter 215, which has a pass band including these lower channels, to high-frequency power amplifier 216 whose output signal is fed to antenna 219. Thus, the amplified, frequency-converted, audio signal Sb is transmitted by antenna 219 of the base unit and is received at antenna 119 of the handset 1.

In circuitry of handset 1, as shown in FIG. 2, the signal Sb received at antenna 119 is fed through bandpass filter 121, which has a pass band that includes all of the lower channels, to high-frequency amplifier 122 that produces output signal $S_b$. The amplified signal Sb is fed as one input to mixer 123 and the second input of mixer 123 is derived as a local oscillator signal of a predetermined frequency from phase-locked-loop (PLL) circuit 143. In this fashion the received signal Sb is converted by mixer 123 to an intermediate frequency (IF) signal that is fed through IF amplifier 124 to FM demodulator 125, where the signal is demodulated down to the audio signal Sr. The demodulated audio signal Sr is fed through low-frequency amplifier 126 to loudspeaker 127 of handset 1, which is manifested as the earphone of the handset.

In handset 1 of FIG. 2, control circuit 130 contained within the dashed lines controls the communication channel over which the handset operates and is constructed as a so-called microcomputer. Control circuit 130 includes a central processing unit (CPU) 131 capable of, for example, 8-bit parallel processing that is connected to read only memory (ROM) 132 in which suitable programs are stored and to random access memory (RAM) 133 that forms a work area for performing various calculations and computations. Access is typically gained to a microcomputer through an input/output unit, which is constructed as various input/output ports. These input/output ports are represented in the control circuit 130 of the present invention as I/O ports 134, 135, 136, 137, and 138, respectively. All of the units comprising the so-called microcomputer are functionally interconnected by system bus 139. A ten-key keypad 141, which permits the user to dial the desired number, is connected to the system bus by I/O ports 134 and 135 and also connected to system bus 139 by I/O ports 134 and 135 is the talk switch 142 having the two positions (not shown) as dicussed above. The ten-key keypad 141 and the talk switch 142 are dynamically scanned by the I/O port 134 in the known fashion and the keys that are depressed or actuated are detected correspondingly by I/O port 135.

Phase-locked-loop circuit 143 is connected by I/O port 136 to the microcomputer so that the frequency dividing ratio of the frequency divider in phase-locked-loop circuit 143 can be changed or controlled by the output from that I/O port. Accordingly, the frequency of the local oscillator signal that is supplied by phase-locked-loop 143 to mixers 114 and 123 can be changed, thereby changing the communication channel over which handset 1 transmits and receives.

Detector 144 is connected to IF amplifier 124 and detects whether the communication channel is already occupied at the time the communication is commenced between handset system 1 and the base unit system 2. That is, IF amplifier 124 is in the signal path of the received signal and detector 144 produces an output signal Si that indicates the presence or absence of the intermediate frequency signal in IF amplifier 124, as determined by mixer 123 and PLL 143. The detected output signal Si is fed to the computing units by way of I/O port 137. Similarly, detector 145 is connected to FM demodulator 125 and derives therefrom a signal Sk that corresponds to an identification code ID and a channel signal CH, which will be described hereinafter. The identification signal ID and channel signal CH produced by detector 145 are fed into the computation units of control system 130 by way of I/O port 137.

Tone generator 146 has an input connected to I/O port 138 and produces an output signal Sa fed to low-power amplifier 126. When calling someone using handset 1, tone generator 146 receives an output from I/O port 138 and generates an alarm-sound signal Sa during the preparation period until the communication link between handset 1 and base unit 2 is completed. Alarm-sound signal Sa is fed to low-power amplifier 126 that drives speaker 127, thereby indicating that an outgoing call is being made. Similarly, tone generator 147 is connected to I/O port 138 and is adapted to convert the identification code ID, a dial signal DS, and the channel signal CH from I/O port 138 from the binary code signal used throughout this system to a frequency-shift-key (FSK) signal Sf in the audio band. This FSK signal Sf is fed to amplifier 112.

The identification code signal ID is the binary coded signal that identifies the handset 1 and its associated base unit 2 and causes them to correspond with each other, thereby preventing communication from being carried out between a handset 1 and base unit 2 which belong to separate cordless telephone systems. The dial code signal DS is the binary coded signal that corresponds to the telephone number which is being called (dialed), and the channel code signal CH is the binary coded signal that indicates the one duplex channel selected from the five possible duplex channels when communication is carried out between handset 1 and base unit 2.

I/O port 138 also generates the control signal fed to FM modulator 113, so that this modulating circuit is controlled to transmit or not transmit the FM signal. I/O port 138 is also connected to bell sound generator 148, which generates a sound to report when an incoming call is present, that is, when the user should answer the phone.

Base unit 2, as shown in FIG. 3, is also provided with a control circuit that is constructed in the same fashion as control circuit 130 utilized for handset system 1 and that functions in a similar fashion. Specifically, base unit control circuit 230 employs a central processing unit (CPU) 231, a read only memory (ROM) 232, and a random access memory (RAM) 233. These elements form the basis of a so-called microcomputer which is connected to input and output data in the conventional fashion using input/output ports, more specifically, I/O ports 236, 237, and 238. All of the elements forming the microcomputer interact and are in electrical communication by way of system bus 239. While control circuit 230 is similar to control circuit 130 note that control circuit 230 does not include circuitry corresponding to tone generator 146 or bell sound generator 148, since these both relate specifically to events that occur only at the handset. Nevertheless, a signal line for transmitting signals SB, SF, and DP is connected between I/O port 238 and signal coupler 229, which couples signals to and from the telephone network lines. Signal SB is a signal utilized to ring the bell at the handset when a call is received from the outside, and signal SF indicates that the handset has been taken up when a call is coming in, which corresponds to the hook switch output, and signal DP is a dial pulse that contains the coded signals used to place an outgoing call. The functioning of this control circuit 230 will be set forth hereinbelow when the operation of the entire system is described.

Figure 4:
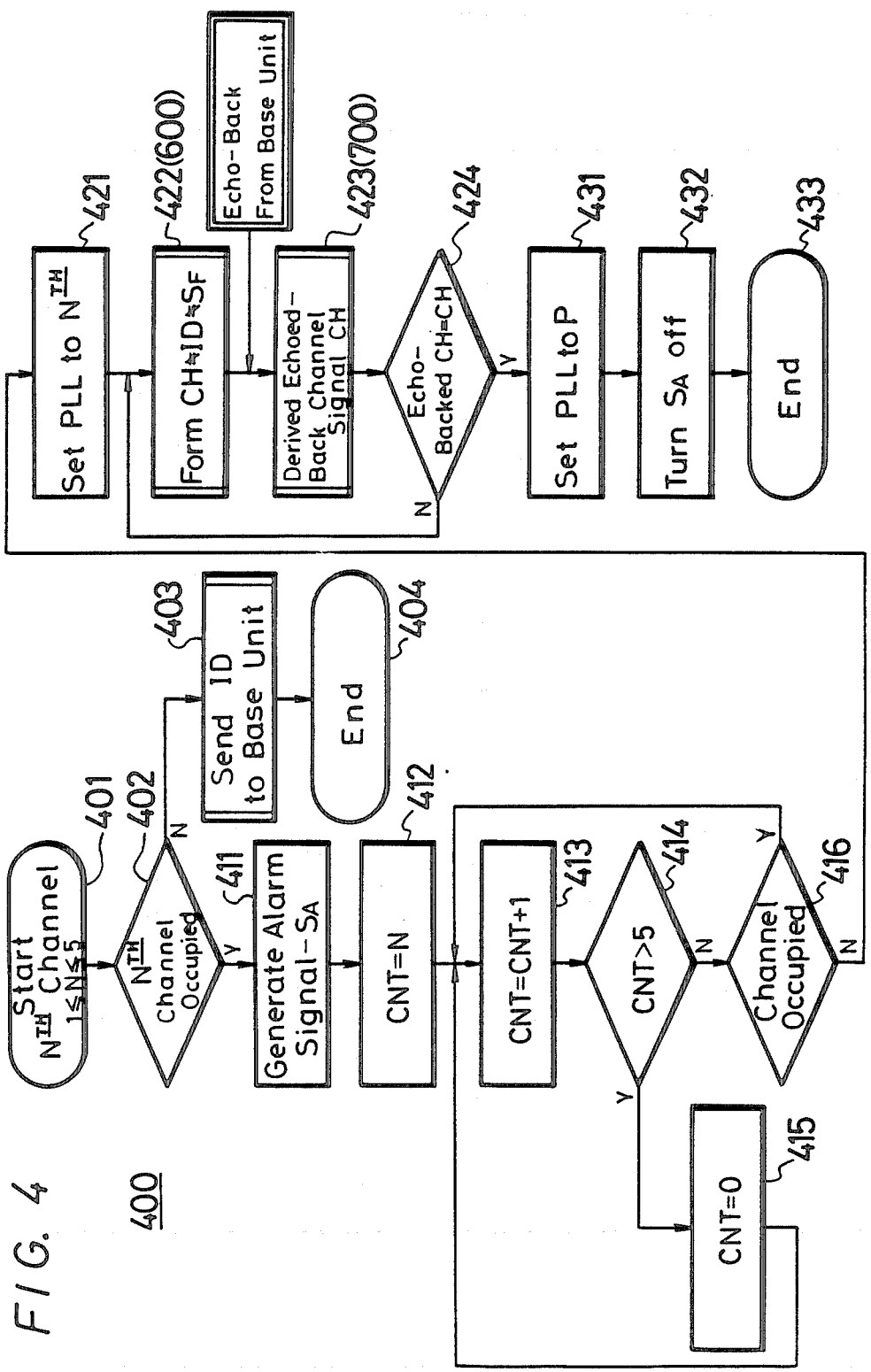
FIG. 4 is a flow chart of a routine showing steps taken to automatically select a vacant channel in a cordless telephone system according to the present invention.

FIGS. 4 through 7 each respectively represent flow charts of main portions of the programs stored in read only memories 132 and 232 of the handset unit 2 and base unit 1, respectively. More specifically, FIGS. 4 and 5 illustrate sub-routines utilized to set the communication channel between the handset system 1 and the base unit system 2. These sub-routines may be best explained by first describing the manner in which the cordless system is used when an outgoing call is to be made, specifically, in making such outgoing calls the following operations are carried out. By an output signal that is produced from changing talk switch 142 of handset 1 from the standby position to the ON position (not shown), modulator 113 in the handset of FIG. 2 is enabled to produce a frequency-modulated signal. Note that I/O port 138 has an output line connected to FM modulator 113. Subsequently, in the handset system 1 a sub-routine 400 represented by the flow chart of FIG. 4 is executed in control circuit 130 and operates to search for the correct communication channel, and the signal Sh is transmitted from the handset system to the base unit. Similarly, in base unit 2 sub-routine 500, which is represented by the flow chart of FIG. 5, is executed which acts to set the communication channel between the handset 1 and base unit 2 and, further, in the base unit 2 modulator 213 is enabled to send the FM signal so that the signal Sb is transmitted from base unit 2 to handset 1. By using the keypad or keys 141 at the handset dial signal DS, which corresponds to the telephone number of the party being called, is generated, and this signal is supplied from I/O port 138 to tone generator 147, wherein it is converted to the FSK signal Sf. Signal Sf is fed through amplifier 112 and transmitted by antenna 119 as signal Sh.

In base unit 2, FM demodulator 225 produces signal Sk fed to detector 245 from which dial signal DS is derived. The dial signal DS is fed into I/O port 237 and the microcomputer provides the dial pulse signal, DP which is transmitted out through I/O port 238 to signal coupler 229 so that the dial pulse signal DP is placed on the telephone network line 3. Thus, when the called phone is answered communication is made possible through FM signals Sh and Sb, as described hereinabove.

Upon placing talk switch 142 of handset 1 in the standby position (not shown), a signal is produced by the microcomputer that is fed out through I/O port 138 to FM modulator 113 that prohibits modulator 113 from delivering the FM signal and, thus, handset 1 is prevented from transmitting signal Sh. Similarly, at the conclusion of the desired conversation when the user puts down handset 1, tone generator 247 produces signal Sf fed to amplifier 212, which prohibits modulator 213 from producing the FM signal and, thus, base unit 2 is prevented from transmitting signal Sb.

Sub-routine 400 shown in FIG. 4 is utilized to set the specific channel for communication between the handset and base unit as follows. The channel that is set when the handset 1 and base unit 2 are manufactured or the channel just previously used may be taken as the $N^{th}$ channel ($1 \leq N \leq 5$), and sub-routine 400 starts at step 401 with this assumption. In step 402 the signal Si from IF amplifier 124 in the handset is detected by detector 144 to determine whether or not the $N^{th}$ channel is occupied at that time. If the $N^{th}$ channel is not occupied then in this embodiment it is desired to be used, and block 403 represents sending the identification code ID to base unit 2. Sub-routine 400 is ended by the stop command at step 404, and the system is returned to the main routine in the microcomputer. Although not shown in the flow chart of FIG. 4, at that very time the base unit 2 performs a step to check whether or not the identification code ID has been correctly sent. If such identification code ID is detected as not being correct, the particular step will be repeated to detect the correct ID code, which is then transmitted back to handset 1. In that case, the communication between handset 1 and base unit 2 is then carried out using the $N^{th}$ channel.

In the event that the $N^{th}$ channel is occupied, that is, in the event that the decision made in block 402 is yes, then the sub-routine advances to step 411 in which tone generator 146 generates the alarm signal Sa that is fed to amplifier 126 of handset 1, so that loudspeaker 127 produces an alarm sound indicating that the channel is now being set. Following production of the alarm sound, the processing continues in this sub-routine to step 412, in which the count value of a channel counter arranged in the particular control circuit (not shown) is set to satisfy the condition, CNT=N. Once this is set, step 413 increments the count value of counter CNT by "1". Proceeding then to step 414 of this sub-routine, it is determined whether the value CNT is greater than 5 and, if so, then CNT is set to zero in step 415 and the processing returns to step 413, where CNT is set equal to one and processing continues. If in the decision step 414 CNT is less than or equal to 5 then processing advances to step 416 in which the decision is made whether the channel indicated by the counter CNT is occupied based upon detector 144 detecting signals Si being present in IF amplifier 124. In other words, signal Si indicates whether or not the channel is occupied and if it is occupied then processing returns to step 413 and the CNT counter contents are incremented by one. Therefore, it may be seen that steps 412 through 416 represent a sub-routine in which searching for a vacant channel is carried out starting from the $(N+1)^{th}$ channel (when N=5, (N+1)=1) which is next to the indicated channel.

If a certain channel is vacant, arbitrarily called channel P herein, then CNT=P is satisfied and channel P is stored in RAM 133 of the handset 1. At that time, processing then advances from step 416 to step 421, in which phase-locked-loop circuit 143 is set at the preceding channel, that is, the $N^{th}$ channel. Note that at that time the channel of base unit 2 is still set at the $N^{th}$ channel. Thus, in step 422 the identification code ID and channel signal code CH, which indicate the new channel (P), are formed. The identification code ID and channel signal CH are generated from I/O port 138 of the handset and fed to tone generator 147 that converts these to signal Sf fed to amplifier 112. Thus, the identification signal ID and the channel signal CH are transmitted to base unit 2 from handset 1 as the signal Sh.

Because the channel signal CH transmitted in step 422 is echoed back from base unit 2 just as it is, this channel signal CH is received in step 423 so that the echoed-back channel signal CH is derived from detecting circuit 145 through I/O port 137. In step 424 then, echoed-back channel signal CH is derived from the output of detecting circuit 145 and in that step the decision is made whether the echoed-back channel signal CH is identical with that transmitted in step 422. If it is not then the processing must be returned in the sub-routine from step 424 to step 422 and the steps repeated until the transmitted and echoed-back signals become identical. When it is determined in step 424 that both channel signals CH are identical, processing advances in the sub-routine to step 431, in which phase-locked-loop circuit 143 is set by the output from I/O port 136, to cause communication channel to occupy the desired new channel P. In the next succeeding step 432 the signal $S_a$ is turned off and the processing is returned to its original routine by the end operation step 433.

Therefore, according to sub-routine 400 shown in FIG. 4, it is determined first whether the previous channel, that is, the $N^{th}$, is occupied and unless such previous channel is occupied, that channel (the $N^{th}$) is used as the communication channel. In the event that the previous channel is occupied, then a new vacant channel P is employed as the communication channel between handset 1 and base unit 2. Moreover, at that time, the new channel is set by using the previous channel, while confirming that the channel signal CH is correct by using its echo back.

On the other hand, when the identification code ID and channel signal CH are formed and transmitted according to step 422, detector 245 in the base unit detects signal $S_k$ and supplies the identification code ID and the channel signal CH to the microcomputer. Note that at that time the base unit 2 is still set at the preceding channel (the $N^{th}$). Accordingly, by following sub-routine 500 as shown in the flow chart in FIG. 5, the echo back of the identification code ID and channel signal CH is carried out and the new channel P is set.

In FIG. 5 the sub-routine 500 begins at start step 501 and proceeds to decision step 502 where it is checked whether the identification code ID is correct or not. If the identification code ID is incorrect, then step 502 is repeated. If the identification code ID is correct, then channel signal CH is received in step 511 and channel signal CH is stored in RAM 233 of the control circuit 230 by step 512. Subsequent to step 512, step 521 enables modulator 213 to transmit the FM signal so that the transmitted signal Sb is at the previous channel, that is, the N$^{th}$ channel. In step 522 the I/O port 238 produces in turn a synchronizing signal, the identification code ID, and the channel signal CH fed to tone generator 247 that converts these signals to signal Sf. Signal Sf is fed to amplifier 212 and ultimately delivered as the transmitted signal Sb from base unit 2. The channel signal CH at that time is the echoed-back signal of the signal received in step 511.

Decision step 523 determines whether detector circuit 245 has detected signal Sk and produced the appropriate output signals DS, ID, and CH. If these signals are produced by detector 245, then the processing step is returned from step 523 to the beginning of the sub-routine at step 502. This processing is necessary in order to deal with the situation where the loop from steps 422 to 424 in the sub-routine 400 (FIG. 4) must be repeated. Accordingly, in this processing it is determined that the coincidence of the identification signal ID and channel signal CH, that relate to the new channel P, are established between handset 1 and base unit 2. If no output is detected from detector circuit 245 in step 523, then the identification code ID and channel signal CH are identical between handset system 1 and base unit 2 and the processing of the sub-routine advances to step 531. In step 531, the phase-locked-loop circuit 243 in base unit 2 is set at the new channel, arbitrarily called channel P herein, by an output from I/O port 236. This sub-routine is ended by the end step 532.

FIG. 6 represents a flow chart of sub-routine 600 that is used to transmit the identification code ID and channel signal CH in steps 422 of sub-routine 400 and steps 522 of sub-routine 500. The sub-routine 600 begins at start step 600 and proceeds to step 602 in which the decision is made concerning the synchronization signals delivered from I/O ports 138 and 238 that are converted to signal Sf by tone generators 147 and 247, respectively, and then transmitted. In succeeding steps 603 and 604 of this sub-routine the identification code ID and channel signal code CH, respectively, are similarly formed in turn and transmitted. Sub-routine 600 is then ended at step 605.

FIG. 7 represents a flow chart of the sub-routine utilized to receive the identification code ID and channel signal code CH in step 423 of sub-routine 400. Again, following a start step 701, step 702 acts to detect a synchronizing signal as performed by detector 145. In the succeeding steps 703 and 704, the identification code ID and channel signal code CH are detected sequentially and the sub-routine 700 ends with the end step 705.

In the situation where handset 1 and base unit 2 are called by an outside party, the relation between handset 1 and base unit 2 is opposite to that described hereinabove and the inventive system acts to connect the handset 1 and base system 2. In such case, when the bell sound signal SB is produced from base unit 2, this bell sound signal SB is detected through I/O port 238 so that signal SB is transmitted from base unit 2. Subsequently, in base unit 2 sub-routine 400 is executed while in handset system 1 sub-routine 500 is executed, the reverse was true in the case of an outgoing call. Accordingly, the communication channel between the handset 1 and base unit 2 is set and at such time FM signal Sh is also transmitted from the handset 1. Once the communication channel between the two separate units is set, in the handset 1 the bell sound generator 148 is driven by I/O port 138 to announce that an incoming call is present. Then, when the user changes the talk switch 142 from the standby position to the ON position, the bell sound generator 148 is turned off, a fact which is reported to the base unit system 2 by signal SF. Accordingly, in base unit 2, the fact that the talk switch 142 is changed from the standby position to the ON position is transmitted in through I/O port 238 to coupler 229 to the calling line. Consequently, communication over the telephone can be made as described above.

Therefore, following the above-described inventive procedure it is possible to provide a cordless telephone which operates so that if the communication channel that is present between handset 1 and the base unit 2 is occupied by some other cordless telephone in the vicinity, the communication channel can be automatically changed to a vacant channel so that no radio interference is produced between the cordless telephone and any neighboring cordless telephones. Moreover, because the present invention provides a system for automatically changing the communication channel to a vacant channel, that is, one that has no interference from neighboring cordless telephones thereon it is not necessary for the telephone owner to operate any channel selector switches or the like in order to select an unused channel. Moreover, it is not necessary for the telephone user to carry the handset and base unit to a service facility in order to change channels and, thus, time and further expense are saved. Also, since the communication channel is automatically changed until a vacant channel is selected it is not necessary for the user to have any knowledge of the previous channel or of any possibly interfering channels.

Further information can be imparted to the user by causing the sounds produced from loudspeaker 127 and the sound produced from tone generator 146 through amplifier 126 to be different so that it can be discriminated from the bell sound produced by buzzer 148 by controlling the kind and tone quality of the generated sounds. Additionally, in place of the audible indication from tone generator 146 that the communication channel between the handset 1 and base unit 2 is being changed it is possible to provide a visual indication by means of a pilot lamp or light emitting diode (LED) or the like.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A cordless telephone system, comprising:
   a base unit having a transmitter-receiver unit including a plurality of different communication channels and being connected to a telephone network;
   a handset having a receiver-transmitter unit including said plurality of different communication channels, whereby communication with said base unit is carried out by transmitting and receiving radio waves over a first selected one of said plurality of communication channels;

detecting means provided in one of said base unit and handset for detecting whether said first selected one of said plurality of communication channels is occupied and, in response to occupation of said first selected channel, producing a channel-occupied signal and switching to a vacant channel;

selecting means provided in the other of said base unit and handset for selecting said vacant channel in response to said channel-occupied signal, so that said vacant channel is seized;

said selecting means including first channel selector means connected in said base unit and second channel selector means connected in said handset;

said detecting means including a first signal detector connected to said base unit and means for producing a channnel identification signal fed to said first channel selector means for selecting a channel in response thereto, and said base unit including means for transmitting said channel identification signal to said second channel selector means for selecting said channel in said handset in response thereto;

said selecting means further including computing means for computing said vacant channel based on the next sequential one of said plurality, and further including a phase-locked-loop circuit having a variable frequency dividing circuit in which the frequency dividing ratio is responsive to said computing means for changing said first and second channel selector means to said vacant channel.

2. A cordless telephone system according to claim 1, further comprising means for transmitting from one to the other of said base unit and handset a channel signal indicative of the channel to be employed, means for echoing back said channel signal to said one of said base unit and handset, and means for determining whether or not said channel signal as transmitted and as echoed back are the same.

3. A cordless telephone system according to claim 1, in which said selecting means further includes first and second signal mixer means arranged in said base unit and said handset, respectively, for changing a channel in each respective unit to said vacant channel.

4. A cordless telephone system, comprising:
a base unit having a transmitter-receiver unit including a plurality of different communication channels and being connected to a telephone network;
a handset having a receiver-transmitter unit including a plurality of different communication channels, whereby communication with said base unit is carried out by transmitting and receiving radio waves over a first selected one of said plurality of communication channels;
detecting means provided in one of said base unit and handset for detecting whether said first selected one of said plurality of communication channels is occupied and, in response to occupation of said first selected channel, producing a channel-occupied signal and switching to a vacant channel; and
selecting means provided in the other of said base unit and handset for selecting said vacant channel in response to the channel-occupied signal, so that said vacant channel is seized;

said selecting means including first channel selector means connected to said base unit and second channel selector means connected to said handset;

said detecting means including a signal detector connected to said handset and means for producing a channel identification signal fed to said second channel selector means for selecting a channel in response thereto, and said handset including means for transmitting said channel identification signal to said first channel selector means for selecting said channel in said base unit in response thereto;

said selecting means further including computing means for computing said vacant channel based on the next sequential one of said plurality, and further including a phase-locked-loop circuit having a variable frequency dividing circuit in which the frequency dividing ratio is responsive to said computing means for changing said first and second channel selector means to said vacant channel.

5. A cordless telephone system according to claim 4, further comprising means for transmitting from one to the other of said base unit and handset a channel signal indicative of the channel to be employed, means for echoing back said channel signal to said one of said base unit and handset, and means for determining whether or not said channel signal as transmitted and as echoed back are the same.

6. A cordless telephone system according to claim 5, in which said selecting means further includes first and second signal mixer means arranged in said base unit and handset, respectively, for changing a channel in each said respective unit to said vacant channel.

7. A method for preventing interference in a cordless telephone system of the kind having a base unit including a receiver and a transmitter and being connected to a telephone network and a handset including a receiver and transmitter for communicating with the base unit by radio waves, the method comprising the steps of:
providing the handset with a plurality of different possible communication channels;
providing the base unit with a corresponding plurality of the same communication channels;
determining that an incoming call or an outgoing call is beginning;
detecting whether or not any signal is present on a first selected one of said plurality of channels;
producing a channel-occupied signal if any signal is detected on said first selected one of said plurality of channels;
causing said receiver and transmitter in each of said base unit and handset to remain at said first selected channel if no signal is detected to be present therein;
changing said receiver and transmitter in each of said base unit and handset to a next selected corresponding channel different from said first selected one of said plurality of channels in response to said channel-occupied signal; and
transmitting and receiving the signals over either said first selected channel or said next selected channel for maintaining communicating through radio waves between said base unit and said handset;
the step of detecting whether or not any signal is present including the step of retaining the identification of said first selected one of said plurality of channels in a memory;
further comprising the step of detecting whether or not any signal is present is present in said next selected channel and selecting a next successive channel different from a preceding channel for transmitting and receiving radio waves between said base unit and said handset.

8. A method for preventing interference in a cordless telephone system according to claim 7, further comprising the steps of transmitting from one to the other of said base unit and handset a channel signal indicative of the channel to be employed, echoing back said channel signal to said one of said base unit and handset, and determining whether or not said channel signal is transmitted and as echoed back are the same.

9. A method for preventing interference in a cordless telephone system according to claim 7, in which the step of detecting whether or not any signal is present is performed at the base unit and includes the steps of producing a channel identification signal; feeding said channel identification signal to a channel selector at said base unit; and transmitting the channel identification signal to the handset for selecting said next selected channel in response thereto.

10. A method for preventing interference in a cordless telephone system according to claim 9, including the further step of computing said next selected channel based on the next sequential one of said plurality of channels, and further including the steps of generating a frequency divided phase-locked-loop signal; and changing the channel to said next selected channel in response to said frequency divided phase-locked-loop signal.

11. A method for preventing interference in a cordless telephone system according to claim 10, in which the step of changing the channel includes the step of mixing the frequency divided phase-locked-loop signal and a frequency modulated information signal in a mixer.

12. A method for preventing interference in a cordless telephone system according to claim 7, in which said step of detecting whether or not any signal is present is performed at the handset and includes the steps of producing a channel identification signal; feeding the channel identification signal to a channel selector at the handset; and transmitting the channel identification signal to the base unit for selecting the channel in response thereto.

13. A method for preventing interference in a cordless telephone system according to claim 12, including the further steps of computing said next selected channel based on the next sequential one of said plurality of channels; generating a frequency divided phase-locked-loop signal; and changing the channel to said next selected channel in response to said frequency divided phase-locked-loop signal.

14. A method for preventing interference in a cordless telephone system according to claim 13, in which the step of changing the channel includes the step of mixing the frequency divided phase-locked-loop signal and a frequency modulated information signal in a mixer.

15. A cordless telephone system, comprising:
base unit means including a transmitter-receiver unit having a plurality of corresponding radio-wave channels and being operably connected to a network of telephone lines;
handset means including a transmitter-receiver unit having an equal plurality of corresponding radio-wave channels for communication with said base unit means over a selected corresponding one of said plurality of radio-wave channels;
detector means operable when no communication is present between said base unit means and said handset means for detecting whether any signal is present in a first channel of said plurality of radio-wave channels and upon detecting such presence producing a channel-occupied signal; and
means responsive to said channel-occupied signal for selecting a second channel of said plurality of radio-wave channels at both said base unit means and said handset means;
said selecting means including first channel selector means in said base unit means and second channel selector means in said handset means, and said detector means being operably connected to said base unit means and including means for producing channel identification signals fed to said first channel selector means for selecting a channel in response thereto and in which said base unit means includes transmitting said channel identification signal to said second channel selector means at said handset for selecting a corresponding channel in response thereto;
said selecting means further including computing means for computing said second selected channel based on the next sequential one of said plurality of radio-wave channels and a phase-locked-loop circuit having a variable frequency dividing circuit in which the frequency dividing ratio is responsive to said computing means for changing the channel to said second selected channel; and
said computing means including read-only memory means containing channel indetification data to identify each of said plurality of radio-wave communication channels.

16. A cordless telephone system according to claim 15, further comprising means for transmitting from one to the other of said base unit and handset a channel signal indicative of the channel to be employed, means for echoing back said channel signal to said one of said base unit and handset, and means for determining whether or not said channel signal as transmitted and as echoed back are the same.

17. A cordless telephone system according to claim 15, in which said selecting means includes first channel selector means at said base unit means and second channel selector means at said handset means, and in which said detector means is operably connected to said handset means and includes means for producing channel identification signals fed to second channel selector means at said handset for selecting a channel in response thereto and said handset includes means for transmitting said channel identification signals to said first channel selector means at said base unit for selecting a corresponding channel in response thereto.

18. A cordless telephone system according to claim 17, in which said selecting means further includes computing means for computing said second selected channel based on the next sequential one of said plurality of radio-wave channels and a phase-locked-loop circuit having a variable frequency dividing circuit in which the frequency dividing ratio is responsive to said computing means for changing the channel to said second selected channel.

19. A cordless telephone system according to claim 18, in which said computing means includes read only memory means for retaining identification signals corresponding to each of said plurality of radio-wave channels.

* * * * *